Aug. 14, 1934.  N. S. FOCHT  1,970,369
HYDRAULIC SHOCK ABSORBER
Filed June 10, 1930
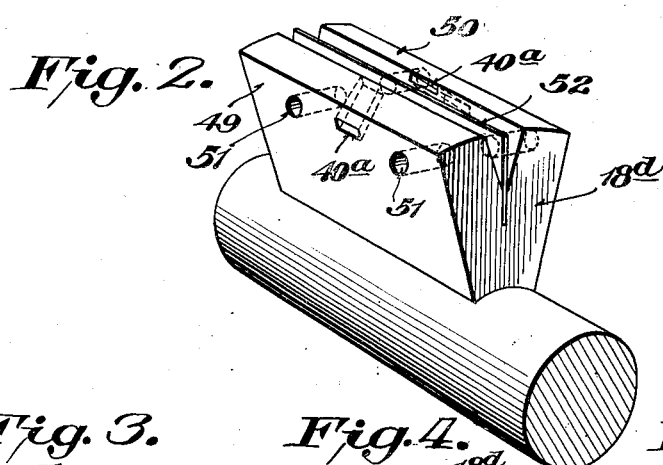
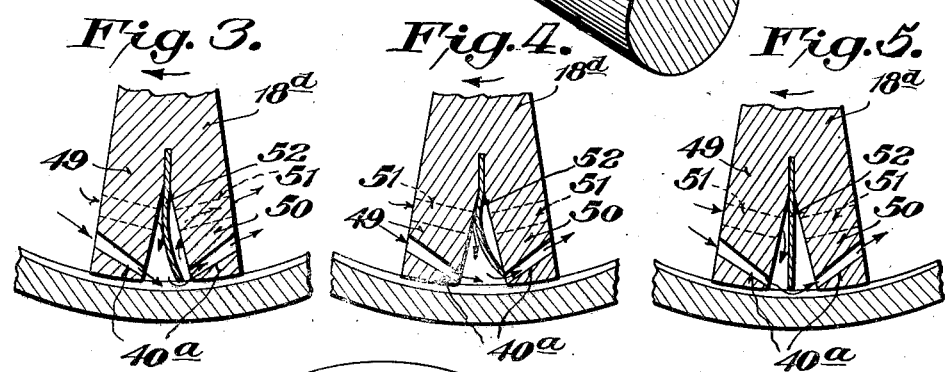
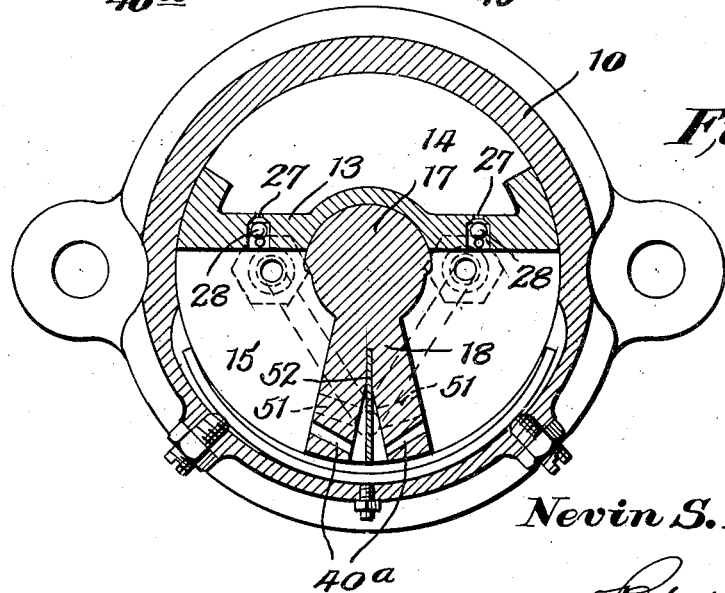
Inventor
Nevin S. Focht,
By
Attorney

UNITED STATES PATENT OFFICE 1,970,369

HYDRAULIC SHOCK ABSORBER

Nevin S. Focht, Pottstown, Pa.

Application June 10, 1930, Serial No. 460,244

5 Claims. (Cl. 188—89)

This invention relates to hydraulic shock absorbers of the general type embodying a radial piston reciprocal within a cylindrical casing, and has generally in view to provide improved means for throttling or metering the flow of liquid from one side to the other of the piston.

In the accompanying drawing, wherein is illustrated one practical embodiment of the invention:—

Figure 1 is a transverse section through a shock absorber of the swinging piston type, illustrating the improved liquid throttling means.

Figure 2 is a perspective view of the piston; and

Figures 3, 4 and 5 are detail sectional views illustrating different operative positions of the liquid throttling or metering means.

Referring to the drawing, 10 designates a cylinder of suitable diameter and length, closed at its ends and divided by a horizontal partition 13 into upper and lower compartments 14 and 15 constituting, respectively, a liquid reservoir and a piston chamber.

A shaft 17 extends through the cylinder 10 below the partition 13 and carries a radial vane or piston 18 which closely fits the chamber and is swingable or reciprocal therein by rotation of the shaft 17. As is understood, the cylinder 10 is to be mounted, for example, upon the chassis of a vehicle and the shaft 17 is to be connected by a lever arm or the like to the vehicle axle for example, whereby relative vertical movements between the axle and the chassis result in swinging or reciprocal movements of the piston 18 within the chamber 15.

Ports 27 provide communication between the reservoir 14 and the chamber 15 to each side of the shaft 17 and said ports are controlled by check valves 28 which open toward the chamber 14 whereby said chamber is maintained at all times filled with liquid.

Ducts or passageways are provided in the piston 18 for the flow of liquid from one side to the other thereof as the piston is swung in one direction or the other, and as the present invention is concerned primarily with the provision of means to control the flow of liquid through said ducts or passageways the present description will be confined to said means, although it is to be understood that the shock absorber may embody various other instrumentalities contributing to its effective control of shocks.

As illustrated, the piston 18 is forked or bifurcated at its outer end to provide the two spaced side portions 49 and 50. Ducts 40a are formed through the piston side portions 49 and 50 and open into the space between said side portions adjacent to the outer end of the piston. In addition, other ports 51 are formed through said side portions 49 and 50 inwardly of the ports 40a and a flexible leaf, inherently resilient valve element 52 is secured at its inner edge at the junction of the side portions 49, 50 and normally occupies a position as illustrated in Fig. 5 spaced from the inner face of each of the side portions 49 and 50 so as to be capable of flexure against either side portion to close the ports 51 therein. Thus, when the piston is swung in either direction there will be an initial flow of liquid through all of the ducts in the piston side portions 49, 50, but, following initial movement of the piston, the pressure of the liquid against the valve element 52 will flex said element to close the ducts in one or the other of the piston side portions, depending upon the direction of movement of the piston, and thus restrict the flow of liquid through the piston. Thereby the movement of the piston will be retarded with the result of producing a shock absorbing or dampening action, the valve element being returned, because of its inherent resiliency, to its normal position illustrated in Fig. 5 whenever liquid pressure thereagainst ceases.

The ducts 40a together with a suitable groove or channel in the inner face of the cylindrical wall of the casing 10 provide for the flow of a certain amount of liquid from one side to the other of the piston at all times, while the valve element 52 serves only to control the flow of liquid through the ducts 51. Thus, the flow of the liquid is so controlled as to produce an efficient shock absorbing effect for small amounts of piston travel and for the initial piston movement during absorption of severe shocks which produce relatively large amounts of piston travel.

I claim:—

1. A hydraulic shock absorber comprising a liquid chamber, a piston reciprocal therein, said piston having a recess and a wall to either side thereof, each wall having a liquid duct formed therethrough for the passage of liquid through the piston from one side to the other thereof, and a flexible leaf valve within said recess to be flexed by the pressure of liquid thereagainst produced by movement of the piston within the chamber to close one or the other of said ports depending upon the direction of movement of the piston, said flexible leaf valve being disposed normally in a position permitting flow of liquid through said ports and being secured to the piston whereby it is returned to said position due to its inherent resiliency whenever the piston comes to a position of rest following movement thereof.

2. A hydraulic shock absorber as set forth in claim 1 in which the recess in the piston is of V-shape and in which the flexible leaf valve is fastened to the piston at the apex of the V-recess for flexure against the inner face of either wall of the piston to close the port therein.

3. A hydraulic shock absorber as set forth in claim 1 in which the recess in the piston is of V-shape and in which the flexible leaf valve is fastened to the piston at the apex of the V-recess and extends normally in spaced relation to both the piston walls for flexure against the inner face of either wall to close the port therein.

4. A hydraulic shock absorber as set forth in claim 1 in which the recess in the piston is of V-shape, in which the flexible leaf valve is fastened to the piston at the apex of the V-recess and extends normally in spaced relation to both the piston walls for flexure against the inner face of either wall to close the port therein, in which the free end of the flexible leaf valve extends in its normal position substantially into engagement with the chamber wall, and in which the chamber wall is provided with a groove for the flow of liquid past the free end of the valve from one side to the other of the piston.

5. A hydraulic shock absorber as set forth in claim 1 in which the piston walls are provided with other ports through which a flow of liquid from one side to the other of the piston is permitted at all times regardless of the position of the valve.

NEVIN S. FOCHT.